United States Patent Office 3,790,645
Patented Feb. 5, 1974

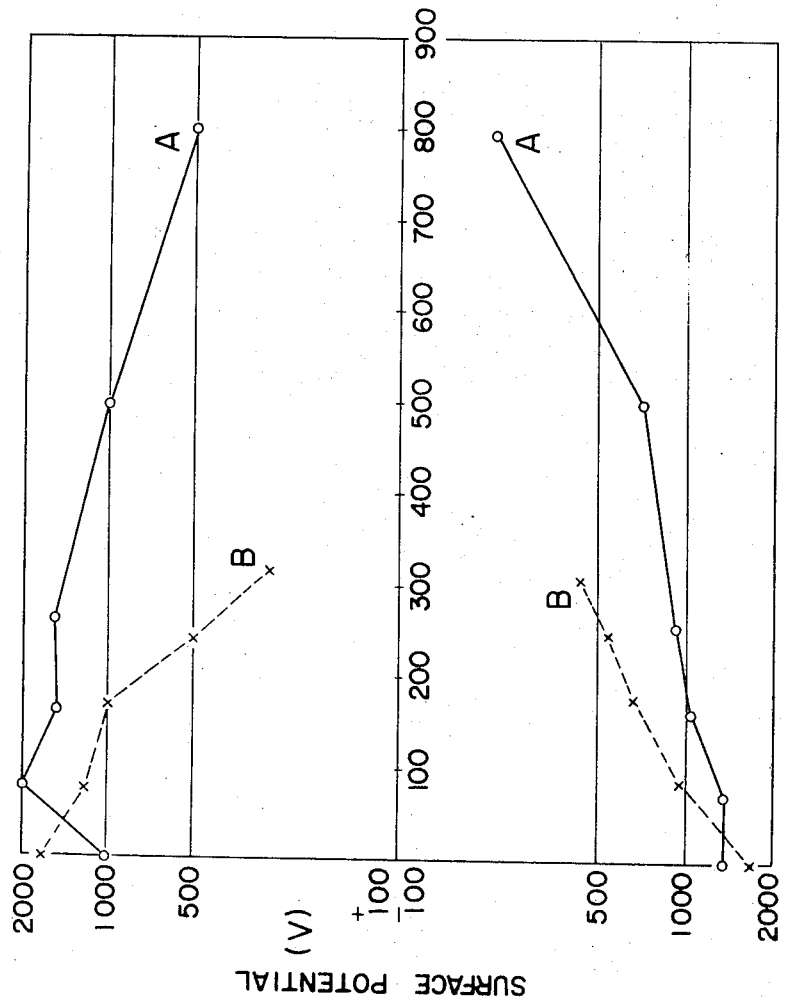

3,790,645
METHOD FOR PRODUCING POLYVINYLIDENE FLUORIDE POLYMETHYLMETHACRYLATE COMPOSITIONS
Naohiro Murayama and Makoto Fukuda, Iwaki, Japan, assignors to Kureha Kagaku Kogyo Kabushiki Kaisha, Tokyo-to, Japan
Filed Aug. 18, 1971, Ser. No. 172,705
Claims priority, application Japan, Aug. 20, 1970, 45/72,929
Int. Cl. C08d 9/08; C08f 29/22
U.S. Cl. 260—884                5 Claims

ABSTRACT OF THE DISCLOSURE

Method for producing uniformly blended polyvinylidene fluoride composition, in which methylmethacrylate and/or other monomers copolymerizable with methylmethacrylate is post-polymerized with polyvinylidene fluoride.

---

This invention relates to polyvinylidene fluoride composition which is obtained by post-polymerizing methylmethacrylate monomer, or methylmethacrylate and other monomers copolymerizable therewith upon polyvinylidene fluoride, and a method for obtaining such composition.

Art has already been known, in which polyvinylidene fluoride and polymethylmethacrylate are dryblended so as to lower temperature for processing the blended polymer material and to increase processability thereof. In this known art, the polyvinylidene fluoride and polymethylmethacrylate appear to be uniformly blended to give a transparent polymer composition, although the composition is not in a real molecular mixture. It has accompanied constant difficulty in respect to uniform blending, when resins having different melt viscosity are to be blended. This tendency becomes remarkable when the degree of polymerization of polymethylmethacrylate is high, hence high melt viscosity. Therefore, when this blended composition is used in a field where uniform blending of the composition is essential, if the blending is carried out by the conventional blending method, the quality of the final product becomes inferior and its capability is remarkably affected thereby. This deterioration in capability is of particular significance when the electrical properties of this type of polymer blend are concerned. For example, the blended composition of polyvinylidene fluoride and polymethylmethacrylate is useful as the material for an electret—a dielectric body in which a permant state of electric polarization has been set up. In this field of use, however, when a severe blending condition is imposed with a view to attaining uniform blending, although such uniform blending brings about favorable result in the electret material, the performance of the resultant electret on the contrary, is lower. Also, even when the electrical capability is not required, if powder coating is to be carried out with the polymer in powder form, such blended composition cannot be properly used as a material for uniform lining. Further, in case a shaped article is intended, there exist various problems such that a blending operation is always necessary, and it is difficult to achieve direct extrusion from powder or compression molding, etc.

It is therefore an object of the present invention to provide a uniformly mixed composition of polyvinylidene fluoride and polymethylmethacrylate.

It is another object of the present invention to provide an improved method for obtaining uniformly blended polyvinylidene fluoride composition without adopting any severe blending conditions to be imposed on materials to be blended as has heretofore been practiced.

The foregoing objects, and details of the present invention will become more apparent from the following description of the invention when read in conjunction with the preferred embodiments thereof as well as in references to the accompanying drawing.

In the drawing, the single figure is a graphical representation indicating in comparative attenuation in the surface potential of two sample electrets, one being made of the mixed composition of polyvinylidene fluoride and polymethylmethacrylate according to the present invention, and the other being made of the same composition obtained by ordinary roll-kneading method, when both are kept in an isothermal chamber of 80° C.

According to the present invention, it has first been made possible to obtain extremely homogeneous polyvinylidene fluoride composition by adding methylmethacrylate to polyvinylidene fluoride produced by suspension polymerization. In the suspension polymerization of vinylidene fluoride, as the polymer does not dissolve into its monomer, i.e., it is a polymerization of inhomogeneous type, the resulting polymer at the termination of the polymerization reaction has a low apparent density and high porosity.

In this case, when methylmethacrylate monomer is added to the vinylidene fluoride polymer in the reaction vessel after completion of the polymerization, the monomer is adsorbed to fine voids (or microvoids) of the produced polyvinylidene fluoride particles, and post-polymerization of the monomer with the polymer is carried out with the aid of the polymerization initiator for vinylidene fluoride polymerization still remaining in the polymer particles. At this time, as the monomer is adsorbed to the fine voids of the polymer particles, the shape of the obtained polymer particles is the same as that prior to addition of the methylmethacrylate monomer, but is of a high apparent density.

The monomer to be added to the polymer should preferably be within a range of 1 to 150% by weight with respect to the polymer. An amount exceeding 150% is not recommended, since there is the possibility of particles consisting of the monomer alone being produced. The most favorable adding quantity is therefore less than 100%, although it generally depends on the polymerization yield.

The polymerization initiator does not always need to be the residual catalyst in vinylidene fluoride polymer, but such catalyst may be added in advance to the monomer to be post-polymerized, in case the polymerization is carried out by suspending once desiccated vinylidene fluoride polymer in water.

The blended polymer composition according to the present invention consists of spherical particles of highly homogenous quality, and can be used as it is for direct extrusion molding, powder coating, etc.

In the known blending method, when polyvinylidene fluoride and polymethylmethacrylate are blended together, the blending work is considerably hindered and the resultant polymer blend is not satisfactorily uniform in quality on account of difference between the two polymers in respect of their melting temperature and melt viscosity. However, the polymer composition according to the present invention is of the uniform composition, which enables mechanical kneading operation to be totally dispensed with, or even if such is required, it can be carried out at a relatively low temperature and with mild kneading, hence the least deterioration of the composition in its properties at the time of processing.

The monomer to be post-polymerized is not limited to methylmethacrylate monomer alone, but any other monomers copolymerizable with methylmethacrylate monomer may be coexistent.

The polyvinylidene fluoride composition according to the present invention possesses excellent electrical property, hence it has wide varieties of application such as electret, film, plate, etc.

In order to enable skilled persons in the art to reduce the present invention into practice, the following actual examples are given. It should, however, be noted that these examples are illustrative only, and do not intend to narrow the scope of protection as recited in the appended claims.

EXAMPLE 1

Into a stainless steel autoclave of a 1-liter capacity, there were added 600 g. of pure water, 2 g. of di-n-propyl peroxydicarbonate, and 0.6 g. of metocel. After evacuating the autoclave, 200 g. of vinylidene fluoride monomer was introduced thereinto from a bomb containing the monomer through a feeding pipe, and solidified. The autoclave was then placed in an isothermal water vessel maintained at 250° C. to conduct polymerization, while agitating the batch at a rate of 350 r.p.m. After 20 hours of the polymerization reaction, the polymerization pressure dropped to 18 kg./cm.$^2$ from the initial pressure of 40 kg./cm.$^2$, when the polymerization was stopped and unreacted vinylidene fluoride monomer was recovered.

160 g. of methylmethacrylate monomer was added to the produced vinylidene fluoride polymer under the atmospheric condition, and a further (or post-) polymerization was conducted at an elevated temperature of 40° C. for 3 hours, while agitating at a rate of 350 r.p.m. The resulted polymer was taken out of the autoclave, filtered, washed with water, and dried at 60° C. for 20 hours. Approximately 30 g. of vinylidene fluoride polymer was obtained. The polymer was of perfect spherical particles, the particle size of which ranged from 50 to 200 microns. The outer appearance thereof was not much different from the homopolymer of vinylidene fluoride.

This polymer was placed in a hot-press machine, heated therein for 5 minutes at 190° C., and, under this heated condition, compression-molded for 1 minute under pressure of 200 kg./cm.$^2$. A pliable sheet having more excellent transparency than the vinylidene fluoride homopolymer was obtained.

The polymer sheet was subjected to a test, in which it was immersed in tetrahydrofuran for 10 hours at its reflux temperature to extract methyl methacrylate alone. From this extraction test, it was found that the content of methylmethacrylate in the polymer was approximately 40%, as the reduction in weight of the polymer sheet was at about 40%.

Next, the post-polymerized polyvinylidene fluoride was compression-molded under heat in accordance with the above-described method to obtain a sheet of 0.5 mm. thick. The sheet was cut in a size of 7 cm. square. Then, both surfaces of the sheet were clamped between stainless steel electrodes, and the entire sheet was placed into an isothermal chamber previously heated to and maintained at 135° C. and kept therein for 1 hour, while applying a voltage of 50 kv./cm. of field intensity to the polymer sheet across the electrodes. Subsequently, in the state of the voltage being applied thereto, the polymer film was cooled to a room temperature in a time period of 1.5 hours, thereby obtaining an electret of the polymer film.

The electret was kept in an isothermal chamber of 80° C., and then its surface potential was measured by a rotary sector type potentiometer with a distance between the electret and the electrode kept at 1 cm. The result showed that the electret had a high voltage of about 1,500 v., and took 800 hours until its surface potential went down to 500 v. (The attenuation curve thereof is shown in FIG. 1 "A".)

EXAMPLE 2

In the same manner and with the same apparatus as in Example 1 above, vinylidene fluoride was homopolymerized. Upon completion of the polymerization, unreacted monomer was recovered.

To the resulted homopolymer of vinylidene fluoride, 10 g. of methyl acrylate and 90 g. of methyl methacrylate were added, and a post-polymerization was conducted at a raised temperature of 40° C. for 3 hours, while agitating at a rate of 350 r.p.m. The thus produced polymer was taken out of the reaction vessel, filtered, washed with water, and dried at 60° C. for 20 hours. Approximately 250 g. of polymer was obtained. The polymer was of perfect spherical particles whose particle size was from 50 to 200 microns, and whose outer appearance was not different from homopolymer of vinylidene fluoride.

This polymer was press-molded under heat into film in the same manner as in Example 1, and subjected to extraction in tetrahydrofuran. It was found out from this extraction that the polymer film contained therein 30% of a copolymer of methyl methacrylate and methyl acrylate.

Also, a film of 0.5 mm. thick was formed in the same manner as in Example 1, cut into a size of 7 cm. square, and then rendered into an electret in exactly the same manner as in the foregoing example. The measured surface potential of the electret was 1,500 v. or as at initial value, and droppage thereof up to 500 v. took about 700 hours.

EXAMPLE 3

The mixed polymer obtained in the same manner as in Example 2 had a size distribution of from 60 to 320 meshes. This polymer was put in a fluidizing chamber, and, when air was sent thereinto, the polymer showed highly excellent fluidity.

When a small piece of iron of 50 x 35 x 30 mm. heated to 200–250° C. for 15 minutes was placed in this fluidizing bed for 1 to 20 minutes, a uniform, smooth coating of about 0.1 mm. was formed on this iron piece. The coated film was highly transparent and lustrous with the least pinhole defect. Such excellent lining is impossibly realized with the polymer blend of vinylidene fluoride homopolymers and polymethylmethacrylate, in which respect the characteristics feature of the mixed polymer according to the present invention resides.

If a thicker coating is desired, the iron piece to be coated may be heated to 190–210° C. for 5 minutes, and then re-immersed into the fluidizing bed.

EXAMPLE 4

Comparative experiment with respect to Examples 1 and 2

60 parts by weight of polyvinylidene fluoride obtained by suspension polymerization and 40 parts by weight of polymethyl methacrylate for injection molding and available in general market were roll-kneaded in a hot-roll previously heated to and maintained at 155° C. for varying time periods of 3, 5, and 8 minutes, respectively.

The polymer blend from the 3-minute kneading was found to be insufficient in the kneading operation, hence non-uniform blending even in its outer appearance. The polymer blend from the 5-minute kneading could produce transparent sheet. When the kneading operation was lengthened to 8 minutes or so, a most perfectly transparent polymer sheet was obtained.

After kneading, each of the polymer blends from the different kneading time was press-formed into a film of 0.5 mm. thick by a hot-press machine under such conditions that it was heated for 5 minutes at 190° C. in the press machine, and then press-formed into the film in that heated state for 1 minute under pressure of 200 kg./cm.$^2$. The molded film was thus treated in accordance with the procedure set forth in Example 1 to render the same into electret.

Measurement of the surface potential of the electret in the same manner as in Example 1 revealed that the electret possessed the surface potential of 1,500 v., and the time taken for its surface potential to be lowered to 500 v. was about 150 hours in the case of the film formed from the polymer blend of the 3-minute kneading, 300 hours in the case of the film formed from the polymer blend of the 5-minute kneading (vide: FIG. 1, curve "B"), and about 100 hours in the case of the film formed from the polymer blend of the 8-minute kneading.

The above facts prove that excessive kneading inevitably shortens the sustained life of the electret, and that even the longest life at 80° C. was approximately 300 hours at most.

In contrast to this comparative example, it is observed that the electret prepared from the polyvinylidene fluoride post-polymerized with methylmethacrylate monomer according to the present invention possesses far longer life than that of the electret prepared from the conventional polymer blend as is apparent from the test results in Examples 1 and 2. Moreover, the polymer material according to the present invention to be rendered into electret does not require kneading operation by a hot-roll or an injection molding machine, or others as in the case of blending polyvinylidene fluoride and polymethyl methacrylate as in the above comparative example, so that there is no possibility of any impurity being mixed into the polymer as apprehended in the case of adopting kneading process in the conventional blending, hence pure polyvinylidene fluoride post-polymerized with polymethylmethacrylate resulted, from which the electret sheet having uniformly dispersed polyvinylidene fluoride and polymethylmethacrylate with high reproducibility can be prepared.

What we claim is:

1. A method for producing a uniformly blended polymer composition consisting of polyvinylidene fluoride and polymethylmethacrylate which comprises: suspension-polymerizing a vinylidene fluoride monomer in the presence of a polymerization catalyst, the resulting suspension polymerizate being in the form of spherical powder particles having micro-pores therein; charging the vinylidene fluoride polymer thus-produced with monomeric methylmethacrylate; and post-polymerizing the after-charged monomer within the micropores of the vinylidene fluoride polymer particles in the state of the monomer being adsorbed to the micro-pores, said post-polymerization being carried out in the presence of a residual catalyst remaining within the micro-pores of the polymer particles.

2. The method according to claim 1, in which the adding quantity of the methyl methacrylate monomer ranges from 1 to 150% by weight with respect to the polyvinylidene fluoride.

3. The method according to claim 1, in which the adding quantity of the methyl methacrylate monomer ranges from 1 to 100% by weight with respect to the polyvinylidene fluoride.

4. The method according to claim 1, in which the post-polymerization is carried out at a temperature of 40° C. to 3 hours.

5. The method according to claim 1, in which methylacrylate which is copolymerizable with methyl methacrylate monomer is added and post-polymerized with polyvinylidene fluoride.

References Cited
UNITED STATES PATENTS

| | | | |
|---|---|---|---|
| 3,257,334 | 6/1966 | Chen et al. | 260—2.1 |
| 3,253,057 | 5/1966 | Ladnler | 260—877 |
| 3,580,829 | 5/1971 | Lanza | 204—159.17 |
| 3,607,827 | 9/1971 | Ambler | 260—41 |

MURRAY TILLMAN, Primary Examiner

R. B. TURER, Assistant Examiner

U.S. Cl. X.R.

260—25 B, 899